United States Patent [19]
Langley

[11] Patent Number: 5,465,526
[45] Date of Patent: Nov. 14, 1995

[54] HIGH-STRENGTH LANDSCAPE RING

[76] Inventor: Bobby J. Langley, 3302 Storey Lake Dr., Tyler, Tex. 75707

[21] Appl. No.: 311,409

[22] Filed: Sep. 23, 1994

[51] Int. Cl.⁶ .................................................. A01G 1/08
[52] U.S. Cl. ...................................................... 47/33; 47/78
[58] Field of Search ............................. 47/33, 30 OT, 47/78 F

[56] References Cited

U.S. PATENT DOCUMENTS

| 2,784,528 | 3/1957 | Radenauer | 47/30 OT |
| 3,724,128 | 4/1973 | Tabone | 47/33 |
| 3,826,040 | 7/1974 | Roberts | 47/30 |
| 5,305,549 | 4/1994 | Albrecht | 47/30 |
| 5,383,302 | 1/1995 | Hill | 47/33 |

FOREIGN PATENT DOCUMENTS

| 329522 | 5/1930 | United Kingdom | 47/33 |
| 19096 | 11/1992 | WIPO | 47/33 |

Primary Examiner—Henry E. Raduazo
Attorney, Agent, or Firm—Richard C. Litman

[57] ABSTRACT

High-strength ring for protecting the trunk of a tree from contact with lawn maintenance equipment, and other hazards, said ring being characterized by a high-strength stabilizing locking mechanism and a rolled upper edge.

5 Claims, 1 Drawing Sheet

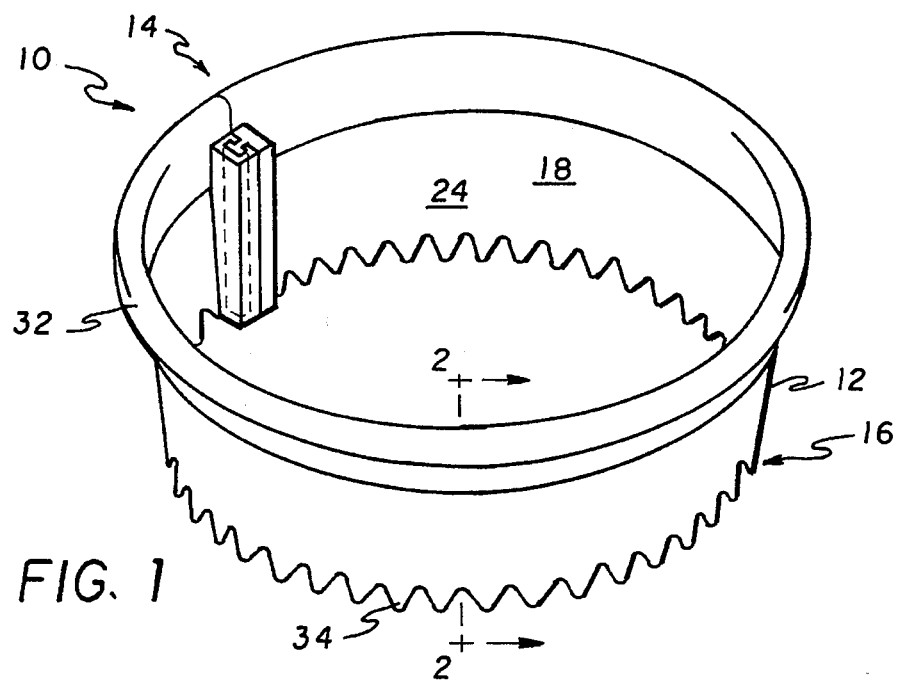
FIG. 1
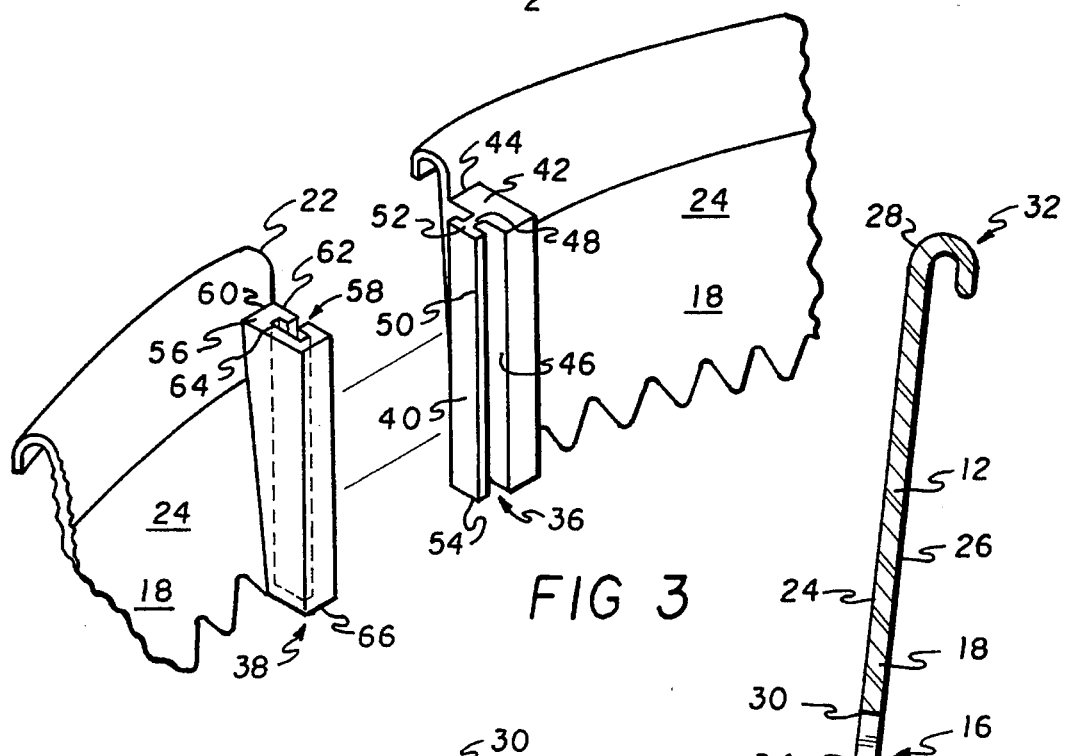
FIG. 3
FIG. 2
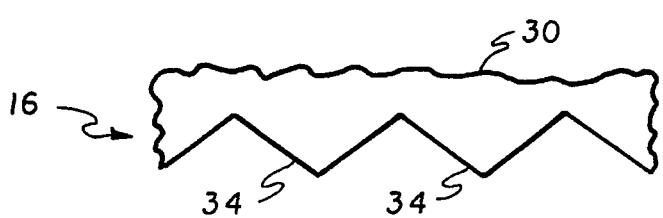
FIG. 4

5,465,526

HIGH-STRENGTH LANDSCAPE RING

BACKGROUND OF THE INVENTION

1. Field of the Invention

The present invention relates to a high-strength landscape ring for the protection of tree trunks. The ring finds particular utility in lawn and garden maintenance programs.

2. Description of the Prior Art

It is known in the prior art to provide a cylindrical landscape ring about the trunk of a tree to protect the trunk from lawn maintenance equipment. One-piece cylindrical landscape rings typically comprise a cylindrical wall which employs a circumferential discontinuity to allow the ring to be deployed around the tree trunk. After deployment, the ring is closed using a connecting means.

In the past, landscape rings had insufficient strength to withstand the repeated and significant stresses likely to be encountered when the ring was kicked or hit by adults, playing children, animals, automobiles, and especially lawn-maintenance equipment such as lawnmowers and string-type trimmers. In addition, rings were circumferentially connected in the past using cumbersome, weak or unstable connecting mechanisms. Many of these mechanisms were characterized by low contact area resulting in low strength. Such connecting mechanisms may suffer from premature failure due to their tendency to fatigue, and eventually yield, when exposed to repeated cycles of installation and removal.

The latch system disclosed in U.S. Pat. No. 2,782,561 to Smith employs a projection which is inserted in a slot and bent downward to secure the closed ring. This system suffers from a lack of stability since the latch only secures the ring at its uppermost edge, leaving the lower portion of the ring subject to torque and breakage when the ring is moved or knocked by lawn maintenance equipment. In addition, the strength of the system is reduced because the connecting mechanism contact area is limited to a U-shaped projection at the upper portion of the ring. The system is also subject to failure due to fatigue since a projection such as that described is subject to yield after several cycles of being locked and unlocked.

The landscape ring disclosed in U.S. Pat. No. 2,909,328 to Babyak employs a connecting mechanism that comprises an essentially tubular coupling having a tubular male projection and a complementary female tubular receptor. Like the Smith mechanism, the Babyak mechanism secures the ring only at its uppermost portion, leaving the lower portion of the ring unlocked and subject to torque. In addition, the contact area in the Babyak mechanism is limited to the area shared between the male and female tubular projections.

Other prior art devices suffer similarly from low strength, low contact area, susceptibility to failure due to torque, susceptibility to yield after repeated use, and expense of manufacture. In still other devices, such as the tree trunk protector disclosed in Canadian Patent 2,041,694, the connecting mechanism employs "hook-like" prongs that are specifically designed to break if the protector is moved from the tree.

A need exists, therefore, for a high-strength landscape ring that employs a high-strength, high stability connecting mechanism that resists yield or loss of resilience after repeated use, installation and removal, that has a high contact area, that provides locking along the entire portion of the ring to minimize torque, and that is inexpensive to manufacture. Most advantageously, such a system would allow the homeowner to place the landscape ring around a tree, lock the ring for stability, strength, and a uniform appearance, and then subject it to routine shock and movement without compromising its connecting mechanism or stability.

SUMMARY OF THE INVENTION

The apparatus of the present invention overcomes the above-mentioned disadvantages and drawbacks which are characteristic of the prior art.

The apparatus of the present invention allows its user to deploy a landscape ring about a tree trunk as a strong and stable barrier against repeated striking by lawn maintenance equipment including string-type trimmers. In addition, the apparatus of the present invention enhances beauty, may be used to contain mulch and soil around plants or trees, and facilitates the watering of plants and trees. The apparatus of the present invention includes a sheet of plastic or other resilient material which is wound into a cylindrical sheath and deployed circumferentially about a tree. The sheet's ends are locked together in the cylindrical shape with a strong connecting means which has a high contact area, which is both resilient and resistant to yield after repeated use, and which forms a contact across the entire height of the sheath so as to minimize damaging torque. The apparatus of the current invention also includes ground-securing or ground-implanting means.

In a preferred embodiment of the present invention, the cylindrical sheath is manufactured by an injection mold process as one or more sheets of strong plastic resilient material, such as propylene, which can be connected end-to-end so as to form a cylinder. Those of ordinary skill in the art will recognize that other manufacturing means and other resilient materials may be employed in manufacturing the invention.

The sheath has an outwardly rolled top for added strength, durability, rigidity, and neat appearance. The connecting means consists of a long T-shaped projection on one end of the sheet and a complementary T-shaped groove on the other, into which the user slides the T-shaped projection thereby connecting and locking the sheet into its cylindrical configuration. The ground-implanting means consists of a plurality of triangular teeth disposed on the bottom of the cylinder. The points of the teeth and the valleys in between the teeth are rounded to a slight curvature to reduce the risk of injury.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings.

BRIEF DESCRIPTION OF THE DRAWINGS

FIG. 1 is a perspective view of the landscape ring;

FIG. 2 is cross section of the landscape ring wall taken along line 2—2 of FIG. 1;

FIG. 3 is a detailed perspective view of the connecting means of the landscape ring shown in FIG. 1; and FIG. 4 is a perspective view of the ground-implanting means of the landscape ring shown in FIG. 1.

DESCRIPTION OF THE PREFERRED EMBODIMENTS

Referring now to the drawings, and particularly to FIG. 1, the landscape ring is shown and generally designated by the reference numeral 10.

As shown in FIG. 1, the landscape ring 10 includes a cylindrical sheath 12, having connecting means 14, and is worked into a stationary and stable position with respect to the ground by implanting means 16. The landscape ring 10 may be arranged concentrically about the trunk of a tree or shrubbery (not shown).

The cylindrical sheath 12 of the landscape ring 10 is comprised of a sheet 18 of resilient material having a male end 20 and a female end 22 between which extends the longitudinal axis of the sheet 18, and having a radially inner surface 24, a radially outer surface 26, a top 28, and a bottom 30. Connecting means 14 secure the male end 20 of the sheet 18 to the female end 22 of the sheet 18 to form a closed loop with the longitudinal axis of the sheet 18 extending circumferentially about the trunk of the tree or shrubbery. The distance between the top 28 and the bottom 30 of the sheet 18 is referred to hereinafter as the height of the sheet 18.

In a preferred embodiment of the present invention, the diameter of the ring 10, when the ring 10 is oriented circumferentially about the trunk of a tree, is slightly greater at the top 28 of the ring 10 than at the bottom 30 of the ring 10. Those of ordinary skill in the art will recognize that the ring 10 may be tapered at a constant, varying, or incremental rate. Those of ordinary skill in the art will further recognize that the ring 10 need not be tapered at all.

As shown in FIG. 2, a rolled edge 32 is formed at the top 28 of the sheet 18 so that the rolled edge 32 curves radially outward from the tree trunk. The implanting means 16 for working the ring into the ground, shown in FIG. 4, is disposed at the bottom 30 of the sheet 18. In a preferred embodiment of the present invention, implanting means 16 comprise a plurality of downwardly projecting triangular teeth 34 having rounded points and valleys. Those of ordinary skill in the art, however, will recognize that other implanting means may be employed and that the teeth 34 may be of another shape.

Connecting means 14, shown in FIG. 3, comprise a male connector 36 and a female connector 38. The male connector 36 comprises a T-shaped projection 40 and a support wedge 42, each with height substantially coextensive with the height of the sheet 18 except for the rolled edge 32 and the securing means 16. The support wedge 42 is disposed at the male end 20 of the sheet 18 such that its radially outer surface 44 complements the curvature and taper of the radially inner surface 24 of the sheet 18. The wedge 42 has an exposed surface 46 adjacent to the male end 20 of the sheet 18, said exposed surface 46 is oriented so as to face the female end 22 of the sheet 18. The T-shaped projection 40 comprises a trunk 48 and two arms 50. The T-shaped projection 40 is disposed on the exposed surface 46 of the support wedge 42 such that its trunk 48 extends away from and along the normal to said exposed surface 46 toward the arms 50. The T-shaped projection has a top 52 and a bottom 54.

The female connector 38 consists of a support wedge 56 and a T-shaped groove 58, each with a height that is substantially coextensive with the height of the sheet 18 except for the rolled edge 32 and the implanting means 16. The support wedge 56 is disposed at the female end 22 of the sheet 18 such that its radially outer surface 60 complements the curvature and taper of the radially inner surface 24 of the sheet 18. The wedge 56 has an exposed surface 62 adjacent to the female end 22 of the sheet 18, said exposed surface 62 is disposed so as to face the male end 20 of the sheet 18. The T-shaped groove 58 has a top 64 and a bottom 66, has an orientation complementary to the T-shaped projection 40, and is sunk into the exposed surface 62 of the support wedge 56.

The female connector 38 and the male connector 36 are adapted to provide a locking connection between the male end 20 and the female end 22 of the sheet 18 when the T-shaped projection 40 disposed on the male connector 36 is received within the T-shaped groove 58 of the female connector 38.

Those of ordinary skill in the art will recognize that the cross-sectional shape of the wedge 42, wedge 56, projection 40 and groove 58 may vary. For example, the projection 40 may be cylindrical or of trapezoidal cross-section with a complementary groove 58. The wedges 42 and 56 may vary with respect to size and cross-section depending upon the manufacturing process used and the support strength desired. Finally, the size of the connecting means 14, and the corresponding protrusion into the area bounded by the ring 10 may be minimized by locating the most radially outward part of the bottom 66 of the groove 58 within the sheet 18.

In operation of the landscape ring 10, a user first applies the ring 10 to the trunk of a tree by:

(a) releasing the connecting mechanism 14;

(b) disposing the landscape ring 10 circumferentially about the trunk of the tree such that the radially inner surface 24 and radially outer surface 26 of the sheet 18 are concentric with the trunk of the tree;

(c) closing the connecting mechanism 14 by flexing the sheet such that the top 52 of the T-shaped projection 40 meets the bottom 66 of the T-shaped groove 58, or such that the bottom 54 of the T-shaped projection 40 meets the top 64 of the T-shaped groove 58, and sliding the T-shaped projection 40 into the T-shaped groove 58 such that the T-shaped projection 40 is disposed within the T-shaped groove 58;

(d) Applying downward pressure to the top 28 of the sheet 18 such that the implanting means 16 is driven into the ground.

While preferred embodiments of the invention have been shown and described, it will be understood by persons skilled in the art that various changes and modifications may be made without departing from the spirit and scope of the invention which is defined by the following claims.

What is claimed is:

1. A high-strength landscape ring comprising:

a) a single sheet of resilient material having a first end a second end, a top, a bottom, and a reinforced upper edge at the top;

b) means for connecting said first end and said second end of said sheet of resilient material to form a cylinder, said means for connecting including,
a first support wedge having a length extending from the top of said sheet to the bottom of said sheet at the first end,
a projecting body disposed on said first support wedge and extending the entire length of said first support wedge,
a second support wedge having a length extending from the top of said sheet to the bottom of said sheet at the second end, and
a groove disposed in said second support wedge, said groove adapted to lockingly receive said projecting body, said groove extending the entire length of said second support wedge; and c) implanting means for working said sheet of resilient material into the ground.

2. The high-strength landscape ring of claim 1 wherein the reinforced upper edge is rolled radially outward from the cylinder.

3. The high-strength landscape ring of claim 1 wherein said implanting means further comprises a plurality of substantially triangular teeth disposed at the bottom of said sheet.

4. The high-strength landscape ring of claim 3 wherein said teeth of said implanting means comprise curved points and valleys.

5. The high-strength landscape ring of claim 1 wherein said projecting body comprises a T-shaped cross-section.

* * * * *